(12) United States Patent
Minamisawa et al.

(10) Patent No.: US 10,795,236 B2
(45) Date of Patent: Oct. 6, 2020

(54) OPTICAL UNIT WITH SHAKE CORRECTION FUNCTION

(71) Applicant: NIDEC SANKYO CORPORATION, Suwa-gun Nagano (JP)

(72) Inventors: Shinji Minamisawa, Suwa-gun Nagano (JP); Takeshi Sue, Suwa-gun Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 164 days.

(21) Appl. No.: 15/938,366

(22) Filed: Mar. 28, 2018

(65) Prior Publication Data

US 2018/0284569 A1 Oct. 4, 2018

(30) Foreign Application Priority Data

Mar. 30, 2017 (JP) ................................. 2017-066744

(51) Int. Cl.
| | |
|---|---|
| *G03B 5/06* | (2006.01) |
| *G02B 27/64* | (2006.01) |
| *H04N 5/225* | (2006.01) |
| *H04N 5/232* | (2006.01) |

(52) U.S. Cl.
CPC .............. *G03B 5/06* (2013.01); *G02B 27/646* (2013.01); *H04N 5/2254* (2013.01); *H04N 5/2257* (2013.01); *H04N 5/23287* (2013.01); *G03B 2205/0023* (2013.01); *G03B 2205/0069* (2013.01)

(58) Field of Classification Search
None
See application file for complete search history.

(56) References Cited

U.S. PATENT DOCUMENTS

| | | | |
|---|---|---|---|
| 2017/0280036 A1* | 9/2017 | Morinaga | ............ H04N 5/2328 |
| 2019/0018259 A1* | 1/2019 | Minamisawa | ....... G02B 27/646 |
| 2019/0278101 A1* | 9/2019 | Minamisawa | ......... H05K 1/189 |

FOREIGN PATENT DOCUMENTS

JP           2016061958 A   *   4/2016

* cited by examiner

*Primary Examiner* — Derek S. Chapel
(74) *Attorney, Agent, or Firm* — Cantor Colburn LLP

(57) ABSTRACT

In an optical unit with shake correction function, a first stopper mechanism configured to define a swinging range of a movable member is composed of: a first projection part for stopper and a second projection part for stopper, both of which are provided in a camera module; and a projection portion (abutment target) of a holder bottom plate member. Therefore, when the first projection part for stopper and the second projection part for stopper; and the projection portion of the holder bottom plate member abut against each other and then movement in the Z axis direction of the movable member is restricted, the camera module does not move in the Z axis direction any more. Accordingly, the camera module does not slip off from a camera module holder of the movable member.

3 Claims, 12 Drawing Sheets

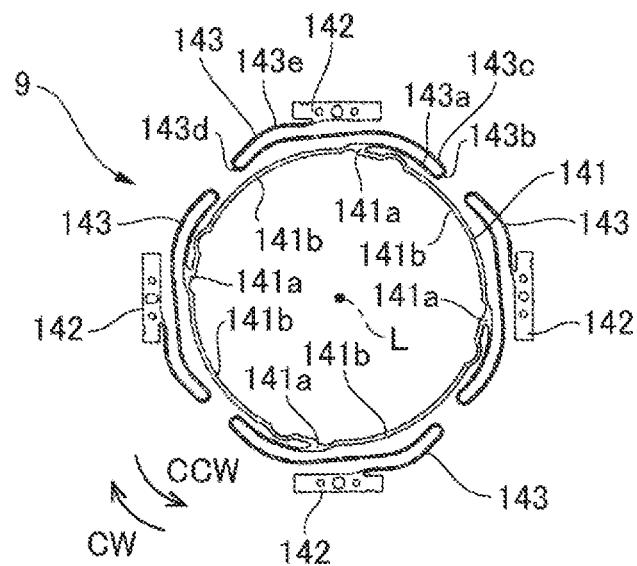
FIG. 11A
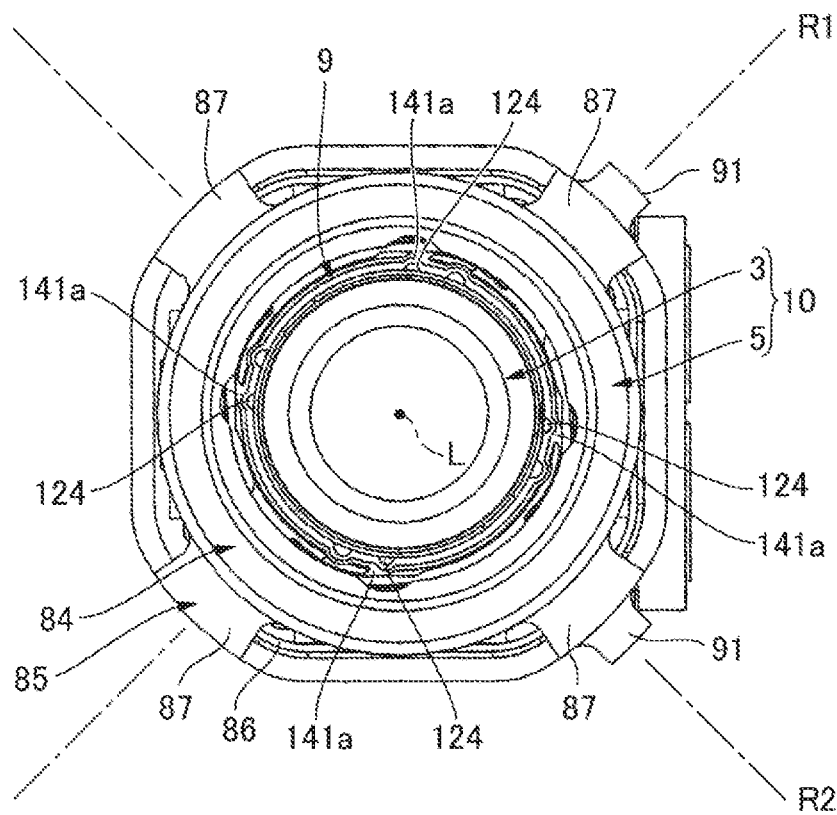
FIG. 11B
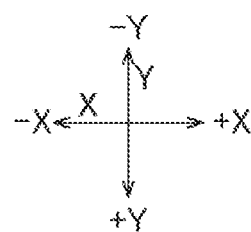

OPTICAL UNIT WITH SHAKE CORRECTION FUNCTION

CROSS REFERENCE TO RELATED APPLICATION

The present application claims priority under 35 U.S.C. § 119 to Japanese Application No. 2017-066744 filed Mar. 30, 2017, the entire content of which is incorporated herein by reference.

BACKGROUND

Field of the Invention

The present invention relates to an optical unit with shake correction function incorporated in a handheld terminal or a mobile object Description of the Related Documents An image pickup apparatus incorporated in a mobile object such as a vehicle or an unmanned helicopter is provided with an optical unit having mounted an optical element for imaging thereon. The optical unit of such a type is required to restrict disturbance of a picked up image exerted by vibration of the image pickup apparatus. Therefore, as the optical unit, there has been proposed an optical unit with shake correction function configured to swing a movable object provided with an optical element in a pitching (vertical swing, tilting) direction and a yawing (transverse swing, panning) direction that is orthogonal to an optical axis.

An optical unit with shake correction function described in Japanese Unexamined Patent Application Publication No. 2016-61958 is provided with: a movable member provided with an optical element; a swingable supporting mechanism configured to swingably support the movable member; a supporting member configured to support a camera module via the swingable supporting mechanism; and a magnetic driving mechanism for swing configured to swing the camera module. The movable member is provided with: the camera module having an optical element and an image pickup element that is positioned on an optical axis of the optical element; and a camera module holder configured to hold the camera module. The camera module is provided with a cylindrical holding part configured to hold the camera module from the outside in a radial direction that is orthogonal to the optical axis. The swingable supporting mechanism is configured to swingably support the camera module holder. The supporting member is provided with a supporting member side opposing part that opposes to the camera module holder from a counter-object side in the optical axis direction.

In addition, the optical unit with shake correction function is provided with a stopper mechanism configured to define a movable range of the movable member. The stopper mechanism is provided with a stopper projection part that projects from the camera module to the supporting member side opposing part.

In the optical unit with shake correction function, of Japanese Unexamined Patent Application Publication No. 2016-61958, if the movable member has been moved to the counter-object side in the optical axis direction by way of an external force, the stopper projection part of the camera module holder and the supporting member side opposing part abut against each other. In this manner, the camera module is disabled to move to the counter-object side any more in a direction of an axis and thus the movable range of the movable member is restricted.

Here, the camera module is provided with the optical element and thus this camera module is comparatively heavy in weight. Therefore, if the stopper projection part of the camera module holder and the supporting member side opposing part abut against each other and then movement in the optical axis direction of the camera module holder is disabled, the moment of inertia acts on the camera module that is held on the side of the holding part, and only the camera module moves in the optical axis direction and then is likely to slip off from the camera module holder.

SUMMARY

At least an embodiment of the present invention has been made in view of the problem described above, and at least an embodiment of the present invention provides an optical unit with shake correction function that is capable of preventing or restricting slippage of a camera module from a camera module holder that is a movable member when movement of the movable member to the counter-object side in the optical axis direction is restricted by way of abutment between the movable member and a supporting member.

In order to solve the problem described above, at least an embodiment of the present invention takes technical means as summarized below. In other words, according to at least an embodiment of the present invention, there is provided an optical unit with shake correction function, the optical unit comprising: a movable member including: a camera module having an optical element and an image pickup element that is positioned on an optical axis of the optical element; and a camera module holder having a cylindrical holding part configured to hold the camera module from an outside in a radial direction that is orthogonal to the optical axis; a swingable supporting mechanism configured to swingably support the movable member; a supporting member configured to support the movable member via the swingable supporting mechanism; a magnetic driving mechanism for swing configured to swing the movable member; and a stopper mechanism configured to restrict a swinging range of the movable member, wherein the supporting member comprises a supporting member side opposing part that opposes, when a side on which the optical element is positioned in the optical axis direction is defined as an object side and a side on which the image pickup element is positioned is defined as a counter-object side, to the counter-object side of the camera module, and the stopper mechanism comprises a stopper projection part that projects from either one of the camera module and the supporting member side opposing part to another one and an abutment target that is capable of abutting against the stopper projection part in such another one.

According to at least an embodiment of the present invention, the stopper mechanism configured to define the swinging range of the movable member is provided with: the stopper projection part that projects from either one of the camera module and the supporting member side opposing part to another one; and the abutment target that is capable of abutting against the stopper projection part in such another one. Thus, in a case where the movable has been moved to the counter-object side in the direction of the axis by way of an external force, the stopper projection part and the abutment target abut against each other in the optical axis direction and then restrict movement of the movable member. Here, the stopper projection part or the abutment target is provided in the camera module. Therefore, when the stopper projection part and the abutment target abut against each other and then the movement in the optical axis direction of the movable member is restricted, the camera module does not move in the optical axis direction any more. Hence, slippage of the camera module from the camera module holder that is a movable member can be prevented or restricted.

According to at least an embodiment of the present invention, it is desirable that the camera module is provided with: a board holder configured to hold a board on which the image pickup element has been implemented; the stopper projection part comprise a first projection part for stopper and a second projection part for stopper that are disposed while an optical axis is sandwiched therebetween; and the first projection part for stopper and the second projection part for stopper project from the board holder. Thus, when the stopper projection part and the abutment target abut against each other, the related impact is not directly transmitted to the image pickup element. Accordingly, damage to the image pickup element can be prevented or restricted.

According to at least an embodiment of the present invention, it is desirable that the first projection part for stopper and the second projection part for stopper be provided while the image pickup element is sandwiched therebetween. Thus, a gap between the first projection part for stopper and the second projection part for stopper can be allocated. In this manner, when the stopper projection part and the abutment target abut against each other, the movable member does not tilt, and the related impact at the time of abutment can be uniformly received by the first projection part for stopper and the second projection part for stopper.

According to at least an embodiment of the present invention, it is desirable that a flexible printed circuit board electrically connected to the image pickup element be provided, and the flexible printed circuit board be connected to the image pickup element after routed between the first projection part for stopper and the second projection part for stopper. Thus, the flexible printed circuit board and the first projection part for stopper and the second projection part for stopper do not interfere with each other. Also, even in a case where the movable member has been moved to the counter-object side by way of an external force, the flexible printed circuit board is not collapsed while being sandwiched between the movable member and the supporting member.

According to at least an embodiment of the present invention, it may be that a second stopper member configured to define the swinging range is provided; the supporting member is provided with a second supporting member side opposing part that opposes to the object side of the camera module holder; and the second stopper member is provided with: the second projection part for stopper that projects either one of the camera module holder and the second supporting member opposing part to another one; and a second target part that is capable of abutting the second projection part for stopper in such another one. Thus, in a case where the movable member has been moved to the object side in the direction of the axis by way of an external force, the second projection part for stopper of the second stopper member and the second abutment target abut against each other in the optical axis direction and can restrict movement of the movable member. In addition, two stopper mechanisms are provided, and the swinging range of the movable member can be thereby reliably defined.

According to at least an embodiment of the present invention, it may be that a fixing member configured to rotatably support the supporting member at the periphery of a predetermined axis and a magnetic driving mechanism for rolling configured to rotate the supporting member are provided; the swingable supporting mechanism is configured to swingably support the movable member in a reference position in which the optical axis and the axis are coincident with each other and a tilt position in which the optical axis tilts relative to the axis; the magnetic driving mechanism for rolling is provided with: a coil fixed to either one of the supporting member and fixing member and a magnet fixed to another one and opposing to the coil; and the supporting member side opposing part is provided with a fixing part configured to hold either one of the coil and the magnet while being oriented to the counter-object side; the fixing member is provided with a fixing side opposing part configured to hold either one of the coil and the magnet while opposing to the supporting member side opposing part in the direction of the axis. Thus, rolling correction of rotating an optical module at the periphery of the axis can be carried out. In addition, the coil or magnet of the magnetic driving mechanism for rolling can be held by utilizing the supporting member side opposing part in which the stopper projection part of the stopper mechanism or the abutment part is provided.

According to at least an embodiment of the present invention, it may be that the supporting member side opposing part is provided with: a projection portion, which projects to the camera module; the stopper projection part is provided in the camera module; and the abutment target is a tip end part of the projection portion. Thus, a portion other than the projection portion in the supporting member side opposing part can be reduced in thickness in the optical axis direction, and the supporting member can be reduced in weight.

According to an optical unit with shake correction function of at least an embodiment of the present invention, a stopper projection part of a stopper mechanism defining a swinging range of a movable member or an abutment target is provided in a camera module. When the stopper projection part and the abutment part abut against each other and then movement in the optical axis direction of the movable member is restricted, the camera module does not move in the optical axis direction any more. Therefore, slippage of a camera module from a camera module holder that is a movable member can be prevented or restricted.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 11A and 11B are illustrative views of a plate spring; and

DETAILED DESCRIPTION

Hereinafter, an embodiment of an optical unit to which the present invention is applied will be described with reference to the accompanying drawing. In the present specification, three axes X, Y, and Z correspond to the related directions that are respectively orthogonal to each other, one side in the X axis direction is designated by +X and the other side by −X; one side in the Y axis direction is designated by +Y and the other side by −Y; and one side in the Z axis direction is designated by +Z and the other side by −Z. The Z axis direction is coincident with a direction of an axis of an optical module. The +Z direction corresponds to an object side in the direction of the axis of the optical module, and the −Z direction corresponds to a counter-object side (image side) in the direction of the axis. The axis of the optical module is coincident with an optical axis of the optical module.

(Entire Configuration)

Figure 1:
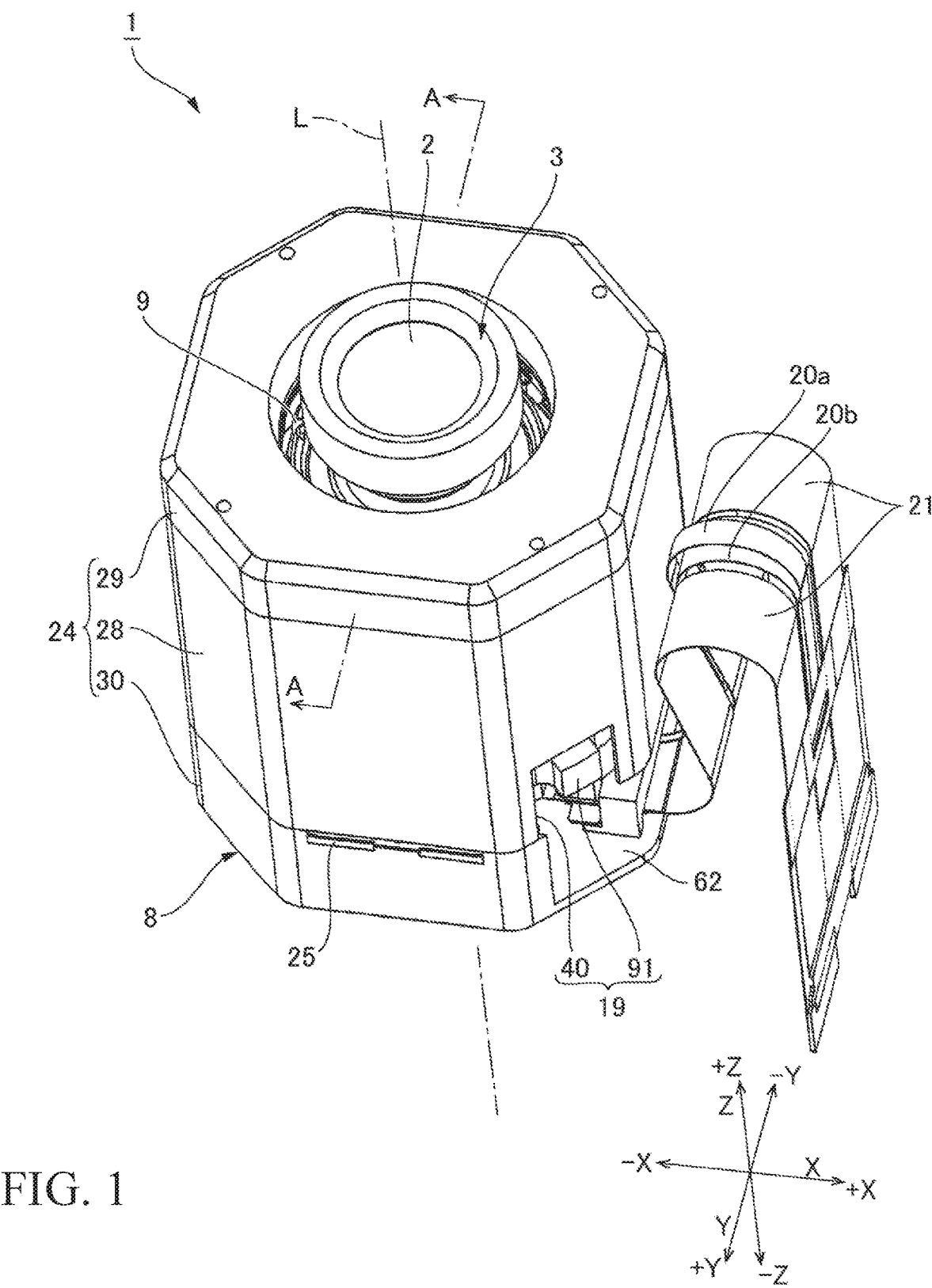
FIG. 1 is a perspective view when an optical unit to which at least an embodiment of is applied is seen from an object side.
Figure 2:
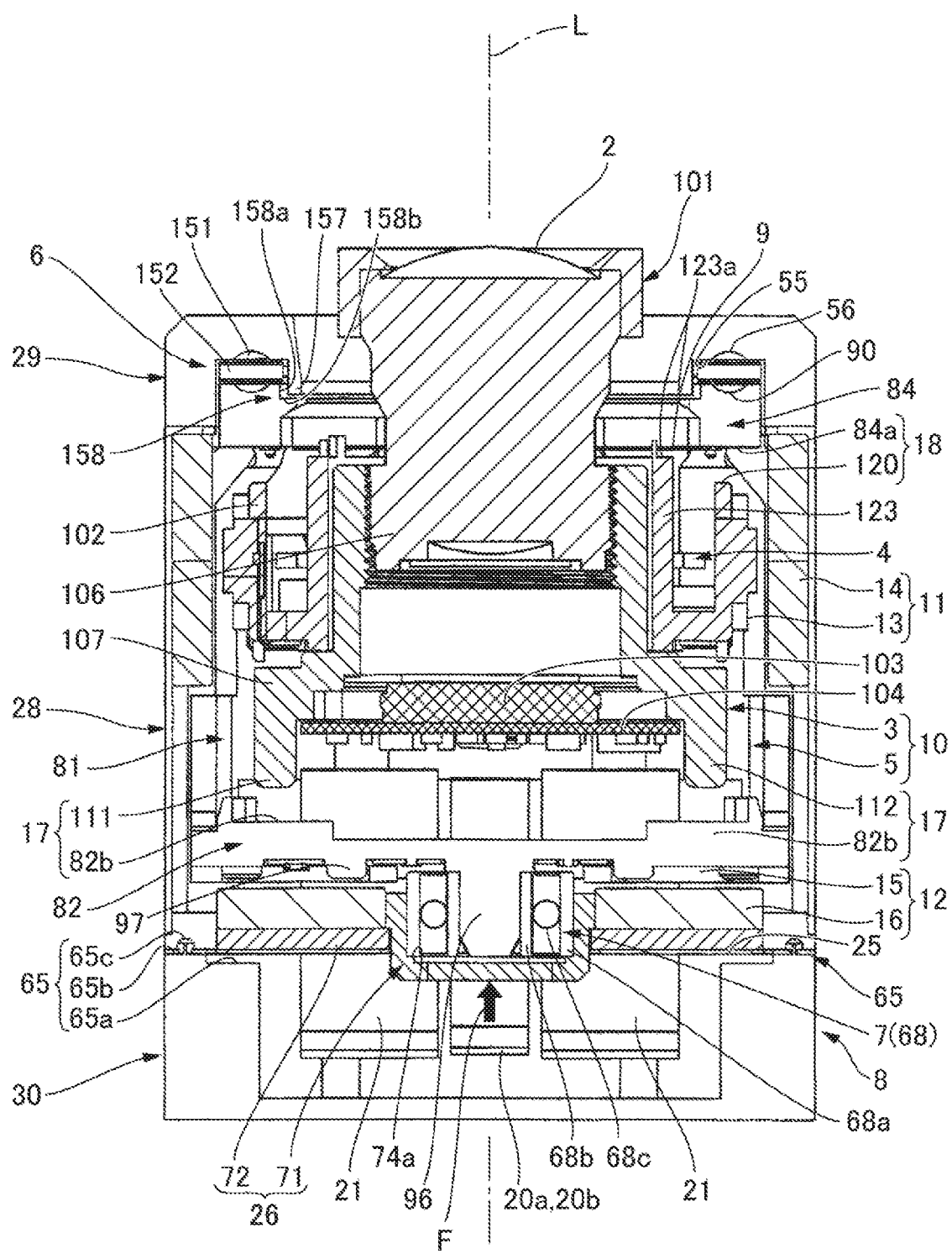
FIG. 2 is a sectional view of the optical unit taken along the line A-A of FIG. 1.
Figure 3:
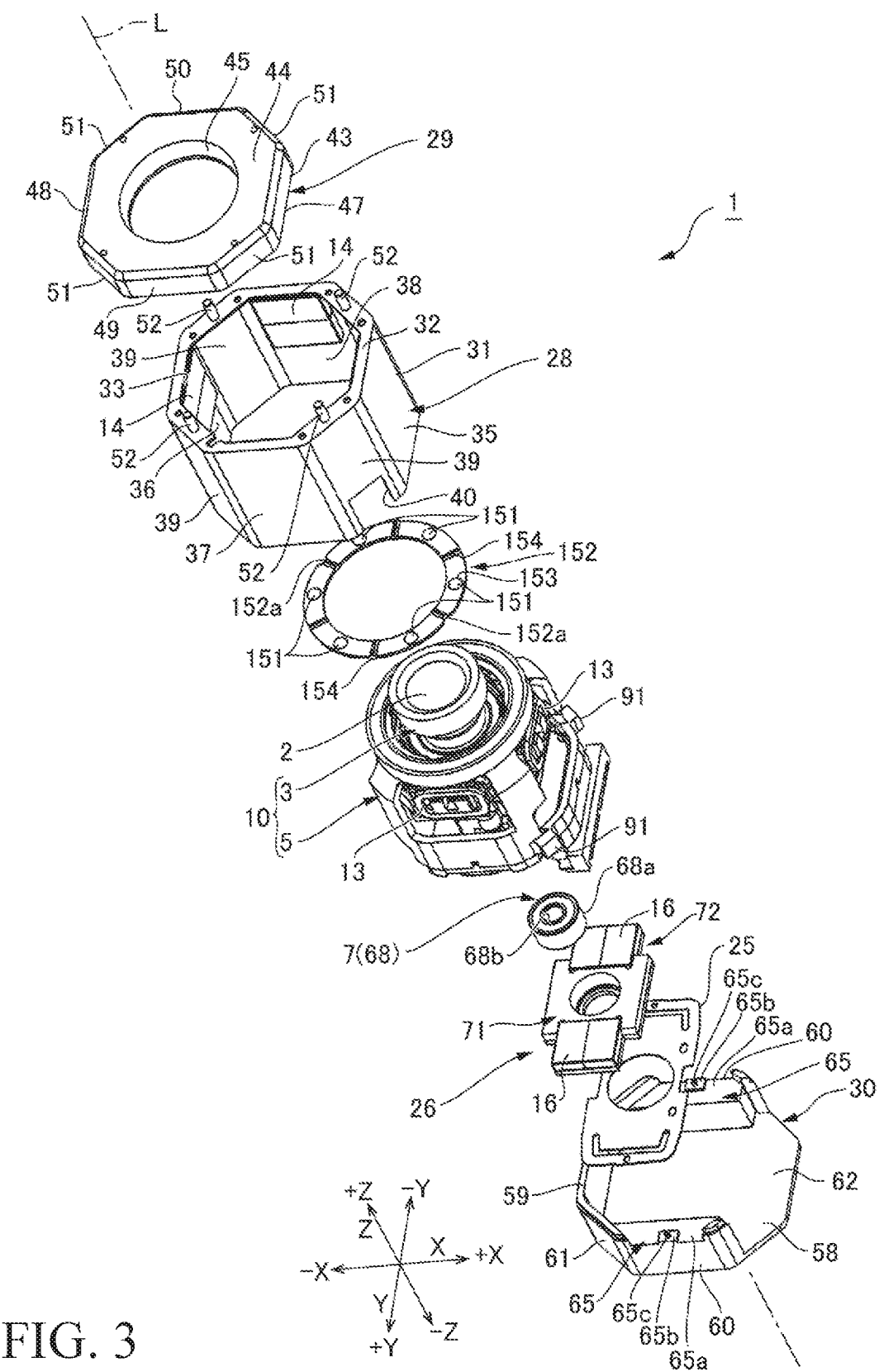
FIG. 3 is an exploded perspective view of the optical unit of FIG. 1 when is seen from the object side.
Figure 4:
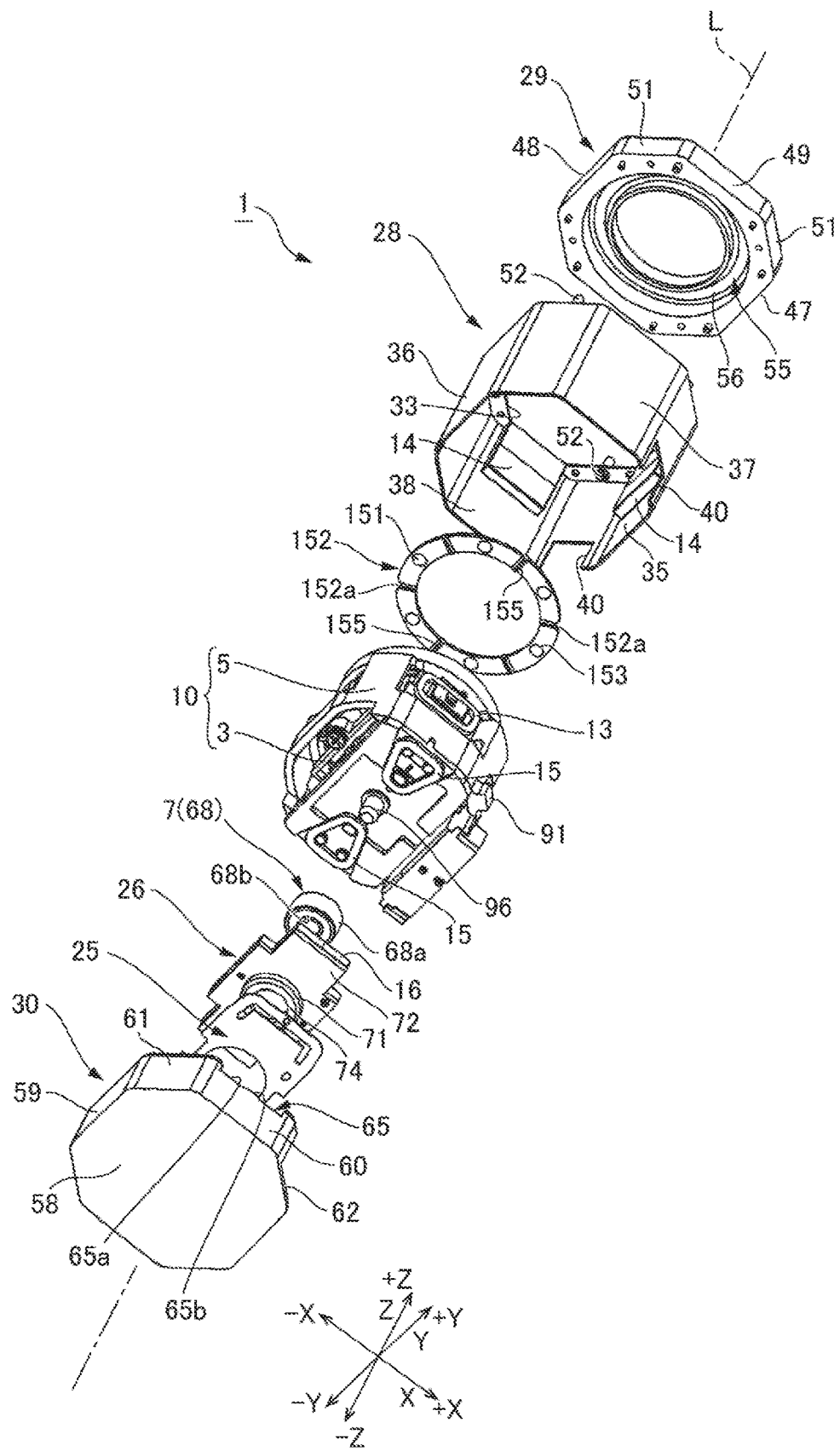
FIG. 4 is an exploded perspective view of the optical unit of FIG. 1 when seen from a counter-object side.

FIG. 1 is a perspective view of an optical unit to which at least an embodiment of is applied when seen from the object side. FIG. 2 is a sectional view of the optical unit taken along the line A-A of FIG. 1. FIG. 3 is an exploded perspective view of the optical unit of FIG. 1 when seen from the object side. FIG. 4 is an exploded perspective view of the optical unit of FIG. 1 when seen from the counter-object side. An optical unit 1 shown in FIG. 1 is used as an optical device in a cellular phone with camera or a drive recorder, for example, or an optical device in an action camera or a wearable camera mounted on a mobile object such as a helmet, a bicycle, or a radio controlled helicopter. In such an optical device, if a vibration of the optical device occurs at the time of imaging, a disturbance occurs in a picked up image. The optical unit 1 corresponds to an optical unit with shake correction function configured to correct tilt of an optical element 2 in order to avoid tilting of the picked up image.

As shown in FIG. 2, the optical unit 1 is provided with: a movable member 3 provided with the optical element 2; a swingable supporting mechanism 4 configured to swingably support the movable member 3; and a holder 5 (supporting member) configured to support the movable member 3 via the swingable supporting mechanism 4. In addition, the optical unit 1 is provided with: a first rotation supporting mechanism 6 and a second rotation supporting mechanism 7 configured to rotatably support the holder 5; and a fixing member 8 configured to support the holder 5 via the first rotation supporting mechanism 6 and the second rotation supporting mechanism 7. Further, the optical unit 1 is provided with a plate spring 9 that is overhung between the movable member 3 and the holder 5.

The swingable supporting mechanism 4 is configured to swingably support the movable member 3 between a reference position in which a predetermined axis L and an optical axis of the optical element 2 are coincident with each other and a tilt position in which the optical axis tilts relative to the axis L. The swingable supporting mechanism 4 is a gimbal mechanism. The first rotation supporting mechanism 6 and the second rotation supporting mechanism 7 are configured to rotatably support the holder 5 at the periphery of the axis L. In other words, the first rotation supporting mechanism 6 and the second rotation supporting mechanism 7 are configured to rotatably support, at the periphery of the axis L, a second movable member 10 that consists of the holder 5 and the movable member 3 that is swingably supported by the holder 5. The first rotation supporting mechanism 6 and the second rotation supporting mechanism 7 are configured between the fixing member 8 and the holder 5. The second rotation supporting mechanism 7 is positioned in the −Z direction (counter-object side) more significantly than the first rotation supporting mechanism 6. The plate spring 9 is for defining the reference position.

In addition, the optical unit 1 is provided with: a magnetic driving mechanism 11 for swing configured to swing the movable member 3; and a magnetic driving mechanism 12 for rolling configured to rotate the holder 5 (second movable member 10). The magnetic driving mechanism 11 for swing is provided with: a swing driving coil 13 that is held by the movable member 3; and a swing driving magnet 14 that is held by the fixing member 8. The swing driving coil 13 and the swing driving magnet 14 respectively oppose to each other in a radial direction that is orthogonal to the axis L. The magnetic driving mechanism 12 for rolling is provided with: a rolling driving coil 15 that is held by the holder 5; and a rolling driving magnet 16 that is held by the fixing member 8. In the present embodiment, the rolling drive coil 15 and the rolling drive magnet 16 respectively oppose to each other in the X axis direction (direction of the axis).

Further, the optical unit 1 is provided with: a first stopper mechanism 17 and a second stopper mechanism 18 that define a swinging range of the movable member 3; and a third stopper mechanism 19 (refer to FIG. 1) configured to define a rotation range of the holder (second movable member). Furthermore, the optical unit 1 is provided with a flexible printed circuit board 20a, 20b, 21. The flexible printed circuit board 20a is electrically connected to the rolling driving coil 15. The flexible printed circuit board 20b is electrically connected to the swinging driving coil 13. The flexible printed circuit board 21 is electrically connected to a board 104 that the movable member 3 holds.

(Fixing Member)

As shown in FIG. 1, FIG. 3, and FIG. 4, the fixing member 8 has: a fixing member main body 24 configured by assembling three casings 28, 29, 30; a plate spring 25 (spring member) that is fixed to the fixing member main body 24; and a movable holder 26 that is supported by the fixing member main body 24 via the plate spring 25. The movable holder 26 is supported in a movable state in the Z axis direction. As shown in FIG. 1, the fixing member main body 24 is provided with: a cylindrical casing 28 formed in a substantially octagonal shape when seen from the side in the Z axis direction (direction of the axis); an object side casing 29 that is assembled in the +Z-direction (object side) relative to the cylindrical casing 28; and a counter-object side casing 30 that is assembled in the −Z direction (counter-object side) relative to the cylindrical casing 28. The cylindrical casing 28 is formed of a magnetic material. The object side casing 29 and the counter-object side casing 30 each are formed of a resin material.

As shown in FIG. 3, the cylindrical casing 28 is provided with: a cylindrical body part 31 formed in an octagonal shape; and a frame-shaped end plate part 32 extending to the inside from an end part in the +Z direction of the body part 31. In a center of the end plate part 32, a substantially octagonal aperture part 33 is formed. The body part 31 is provided with: side plates 35, 36 respectively opposing to each other in the X axis direction; side plates 37, 38 respectively opposing to each other in the Y axis direction; and a side plate 39 provided at four corners, each of which tilts at an angle of 45 degrees relative to the X axis direction and the Y axis direction. As shown in FIG. 3 and FIG. 4, on the inner circumferential faces of the side plates 35, 36 respectively opposing to each other in the X axis direction and the side plates 37, 38 respectively opposing to each other in the Y axis direction, swing driving magnets 14 are respectively fixed. In addition, as shown in FIG. 4, in two side plates 39 that are positioned in the +X direction of four side plates 39, rectangular cutout parts 40 are respectively formed. The cutout parts 40 each are formed in a shape in which an end edge in the −Z direction of the side plate 39 is cut away in the +Z direction.

The object side casing 29 is provided with: a cylindrical body part 43 abutting against the end plate part 32 of the cylindrical casing 28; and an end plate part 44 extending to the inside from an end part in the +Z direction of the body part 43. In a center of the end plate part 44, a circular aperture part 45 is formed. As shown in FIG. 4, an inner circumferential face of the body part 43 is a substantially circular shape, and is a substantial octagonal shape when seen from the side in the Z axis direction. An outer circumferential face of the body part 43 is provided with: side faces 47, 48 respectively opposing to each other in the X axis direction; side faces 49, 50 respectively opposing to each other in the Y axis direction; and a side face 51 provided at four corners, each of which tilts at an angle of 45 degrees relative to the X axis direction and the Y axis direction. The object side casing 29 is fixed to the cylindrical casing 28 by way of four head screws 52 passing through the end plate part 32 of the cylindrical casing 28 in the −Z direction and screwed to the body part 43. Here, a face in the −Z direction of the end plate part 44 is an annular end face that is coaxial to the axis L, and is also a fixing member side opposing part 55 that corresponds to the holder 5 in the Z axis direction. In the fixing member side opposing part 55, a fixing member side annular groove 56 is provided. The fixing member side annular groove 56 is coaxial to the axis L, and the related sectional shape is an arc.

The counter-object side casing 30, as shown in FIG. 3, is provided with: an end plate part 58 formed in a substantially octagonal shape and orthogonal to the axis L; a wall part 59 rising in the +Z direction from an end edge (edge) in the −X direction of the end plate part 58; two wall parts 60 rising in the +Z direction from an end edge (edge) in the −Y direction of the end plate part 58 and an end edge (edge) in the +Y direction and respectively opposing to each other in the Y axis direction; and two wall parts 61 positioned between the wall part 59 and a respective one of the two wall parts 60, each of which tilts at an angle of 45 degrees relative to the X axis direction and the Y axis direction. Here, a wall part is not provided at an end edge (edge) in the +X direction of the end plate part 58, and an aperture part 62 is provided between edges in the +X direction of the two wall parts 60 respectively opposing to each other in the Y axis direction. As shown in FIG. 1, the aperture part 62 is a drawing outlet of the flexible printed circuit boards 20a, 20b, 21.

At end portions in the +Z direction of the two wall parts 60 respectively opposing to each other in the Y axis direction, plate spring fixing parts 65 that fix both end parts in the Y direction of the plate spring 25 are respectively provided.

Each plate spring fixing part 65 is provided with: an end face 65a spreading in the X axis direction and the Y axis direction in an offset location in the −Z direction more significantly than a tip end of the wall part 59; a rectangular projection part 65b that is formed at an edge portion on the outer circumferential face of each end face 65a; and a circular projection 65c that projects in the +Z direction from a center of the rectangular projection part 65b.

Figure 5:
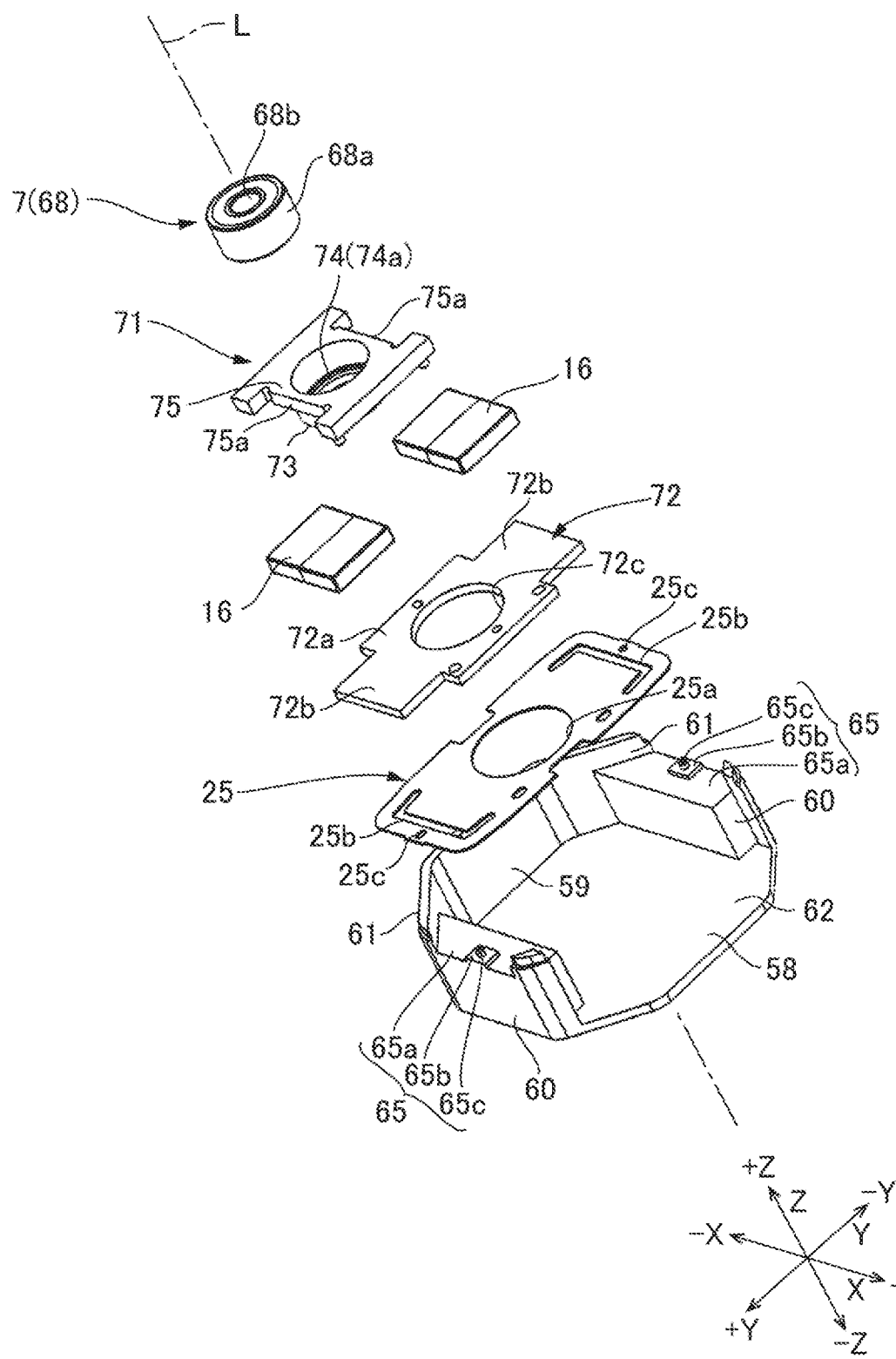
FIG. 5 is an exploded perspective view of a counter-object side portion of a fixing member.

FIG. 5 is an exploded perspective view of counter-object side portion (second rotation supporting mechanism 7, movable holder 26, plate spring 25, and counter-object side casing 30) of the fixing member 8. As shown in FIG. 5, the movable holder 26 is provided with: an outer ring 68a of a ball bearing 68 that configures the second rotation supporting mechanism 7; and a movable holder main body member 71 configured to hold two rolling drive magnets 16. In addition, the movable holder 26 is provided with a yoke 72 that abuts against the movable holder main body member 71 in the −Z direction. The movable holder main body member 71 is provided with: a cylinder part 73 with which the outer ring 68a engages, on the inner circumferential side; a circular ring-shaped part 74 projecting to the inner circumferential side from an end in the −Z direction of the cylinder part 73; and a magnet holding part 75 spreading in the outer circumferential side from an end portion in the +Z direction of the cylinder part 73. The circular ring-shaped part 74 is provided with an annular abutment part 74a that abuts against the outer ring 68a in the −Z direction. The magnet holding part 75 is provided with a pair of rectangular depression part 75a that depress from both sides in the Y axis direction to the inside in the radial direction. Two rolling drive magnets 16 are respectively engaged into the depression parts 75a from the outer circumferential side and then are held by the movable holder main body member 71.

A yoke 72 is formed of a magnetic material. The yoke 72 is provided with: a rectangular portion 72a that is positioned at a center portion in the Y axis direction; and a rectangular portion 72b extending from the wide portion 72a to both sides in the Y axis direction. A width of the rectangular portion 72b in the X axis direction is smaller than a width of the wide portion 72a. In a center of the wide portion, a circular hole 72c is provided. In the yoke 72, the cylinder part 73 of the movable holder main body member 71 is inserted into the circular hole 72c from the side in the +Z direction; the wide portion 72a abuts against the movable holder main body member 71 in the −Z direction; and the rectangular portion 72 abuts against the rolling drive magnet 16 in the −Z direction. A contour shape of the yoke 72 is coincident with a contour shape of the movable holder main body member 71 having held the rolling drive magnet 16 by itself when seen from the side in the Z axis direction. Here, in the yoke 72, an adhesive agent is applied to a portion which the rolling drive magnet 16 abuts against, and the rolling drive magnet 16 is fixed to the yoke 72 as well.

The plate spring 25 has a substantially rectangular contour shape that is elongated in the Y axis direction, the plate spring 25 has a through hole 25a through which the cylinder part 72 of the movable holder main body member 71 can be inserted into the center in the Y axis direction. In addition, the plate spring 25 has a U-shaped slit 25b on both sides in the Y axis direction while the through ole 25a is sandwiched therebetween. The shape of the two slits 25b is adapted to frame an end portion in the Y axis direction of the yoke 72 when the yoke 72 and the plate spring 25 are overlapped each other. In addition, the plate spring 25 has a fixing hole 25c for fixing the plate spring 25 to the plate spring fixing part 65 at each end portion in the Y axis direction (outer in the Y axis direction than the two slits 25b).

The plate spring 25 is supported by the plate spring fixing part 65 in a state in which the projection 65s is inserted into the fixing hole 25c and the center portion at each end portion in the Y axis direction is placed on the projection part 65b. In addition, as shown in FIG. 1, the cylindrical casing 28 and the counter-object side casing 30 are assembled with each other, and the plate spring 25 is thereby sandwiched between the cylindrical casing 28 and the counter-object side casing 30 and then is fixed to the fixing member 8. Here, as shown in FIG. 2, when the movable holder 26 is supported by the fixing member 8, it follows that the plate spring 25 imparts a fixing force F of biasing the movable holder 26 to the +Z axis direction (object side). That is, it follows that the plate spring 25 slackens in the −X direction (counter-object side) at a portion on the inner circumferential side more significantly than each end portion in the Y axis direction that is fixed to the plate spring fixing part 65, and biases the movable holder 26 in the +Z axis direction by its elastically resilient force.

(Holder)

Figure 6:
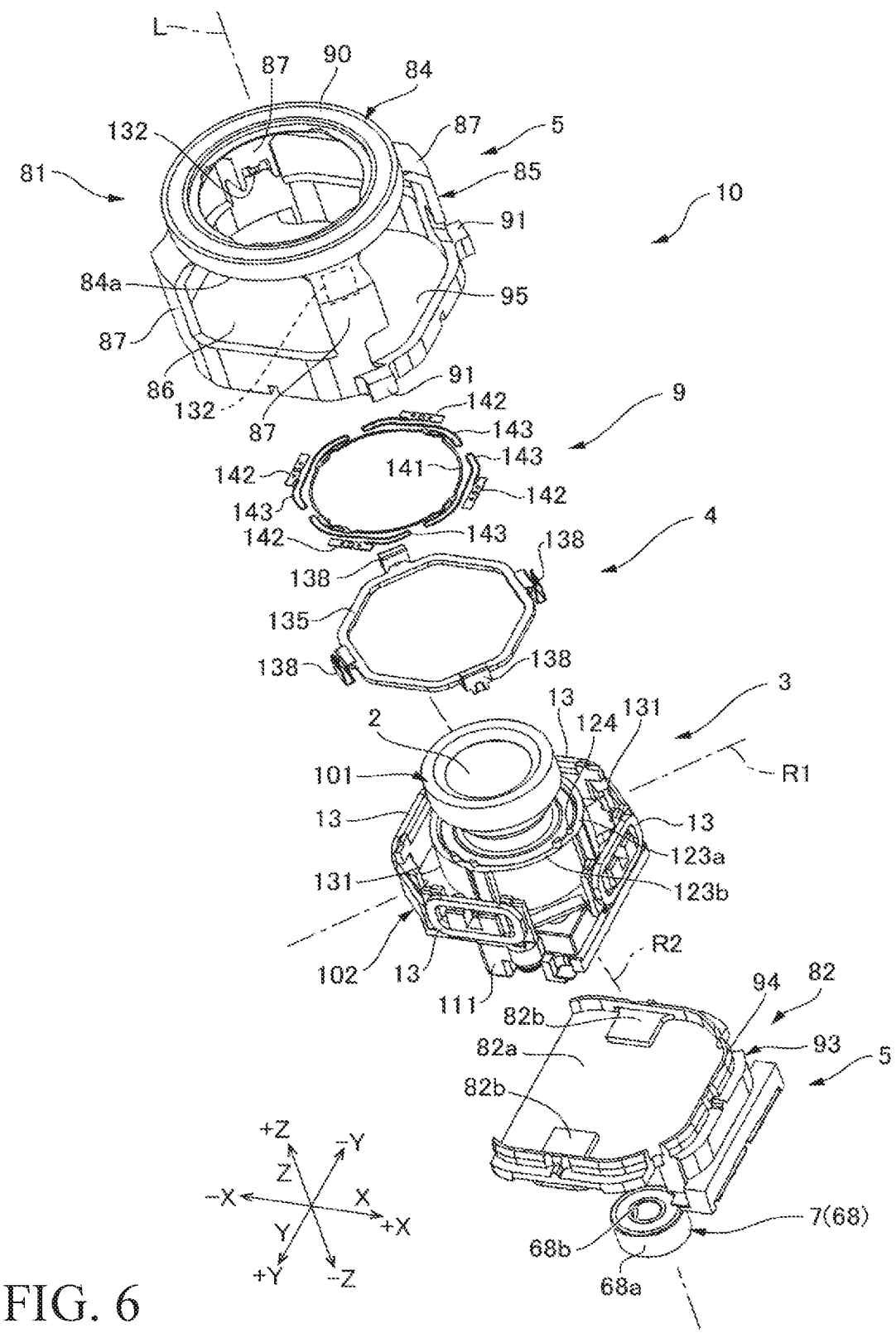
FIG. 6 is an exploded perspective view of a movable member and a holder when seen from the object side.
Figure 7:
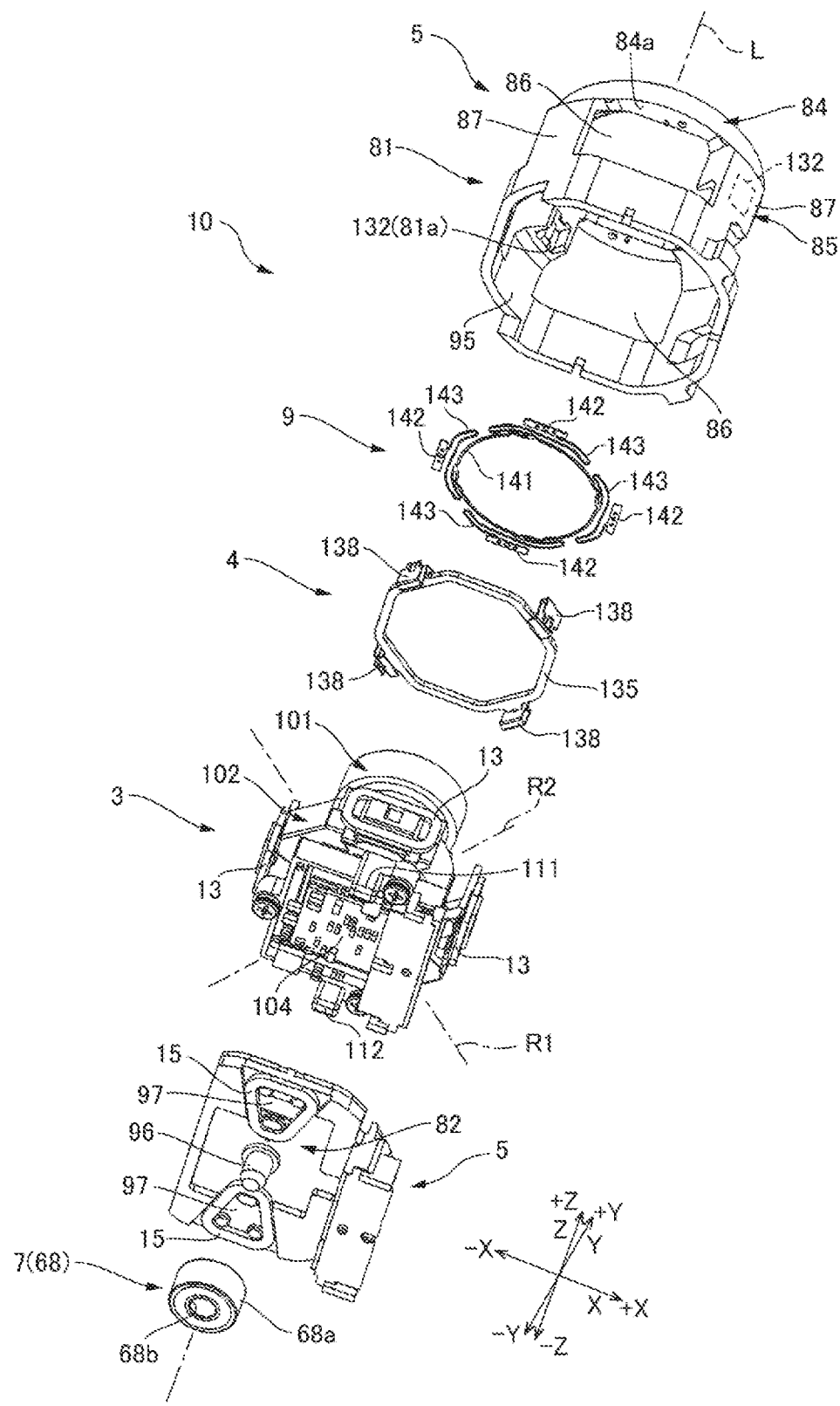
FIG. 7 is an exploded perspective view of the movable member and the holder when seen from the counter-object side.

FIG. 6 is an exploded perspective view of the movable member 3 and the holder 5 (second movable member 10) when seen from the side in the +Z direction side. FIG. 7 is an exploded perspective view of the movable member 3 and the holder 5 (second movable member 10) when seen from the side in the −Z direction side. As shown in FIG. 6, the holder 5 is provided with a holder main body member 81 that is positioned on the outer circumferential side of the movable member 3; and a holder bottom plate member 82 (supporting member side opposing part) that is fixed to the holder main body member 81 in the −Z direction, the holder bottom plate member opposing to the movable member 3. The holder main body member 81 and the holder bottom plate member 82 are made of a resin.

As shown in FIG. 6, the holder main body member 81, at an end in the +Z direction, is provided with: an annular holder side opposing part 84 that opposes to the annular fixing member side opposing part 55 in the fixing member 8 (object side face 29); and a holder body part 85 that is continuous in the −Z direction of the holder side opposing part 84. The holder body part 85 is provided with: four window parts 86 that are arranged in a circumferential direction; and four longitudinal frame parts 87 configured to partition the window parts 86 adjacent to each other in the circumferential direction. Two window parts 86 of the four window parts 86 open in the X axis direction, and the other two open in the Y axis direction. The four longitudinal frame parts 87 are respectively disposed in their angular locations between the X axis direction and the Y axis direction.

The holder side opposing part 84 is an annular end face on which an end face in the +Z direction is orthogonal to the axis L, and on the annular end face, a holder side annular groove 90 is provided. The holder side annular groove 90 opposes in the Z axis direction to the fixing member side annular groove 56 that is provided in the holder side opposing part 84. The holder side annular groove 90 is coaxial to the axis L, and the related sectional shape is an arc. The holder side opposing part 84 is provided with an annular end face 84a that is orthogonal to the axis L, the annular end face being oriented in the −Z direction.

In an end portion in the −Z direction in the holder body part 85, a projection 91 that projects in an intermediate direction between the +X direction and the +Y direction and a projection 91 that projects in a middle direction between the +X direction and −Y direction are provided.

The holder bottom plate member 82 has an opposing face 82a that is orthogonal to the axis L, the opposing face opposing to the movable member 3 in the −Z direction. In each end portion in the Y axis direction in the opposing face 82a, a rectangular projection portion 82b (abutment target) that projects in the +Z direction is provided. At an outer circumferential edge of the opposing face 82a of the holder bottom plate member 82, a stepped part 93 that surrounds a bottom plate from both sides in the Y axis direction and from the side in the +X direction is provided. The stepped part 93 has an annular projection part 94 that protrudes in the +Z direction on the inner circumferential side. When the holder bottom plate member 82 is fixed to the holder main body portion 81, an annular projection part 94 engages into an aperture part 95 in the −Z direction of the holder main body portion 81 (holder body part 85).

In addition, the holder bottom plate member 82, as shown in FIG. 7, is provided with a shaft part 96 that projects in the −Z direction. The shaft part 96 is provided so as to be coaxial to the axis L. The shaft part 96 is configured to hold an inner ring 68b of the ball bearing 68 on the outer circumferential side. An end face in the +Z direction in the inner ring 68b abuts against the holder bottom plate member 82. In addition, the holder bottom plate member 82 is provided with the rolling drive coil holding part 97 on both sides while the shaft part 96 is sandwiched therebetween in the Y axis direction. The rolling drive coil 15 is held by the rolling drive coil holding part 97 in the −Z direction.

(Movable Member)

Figure 8:
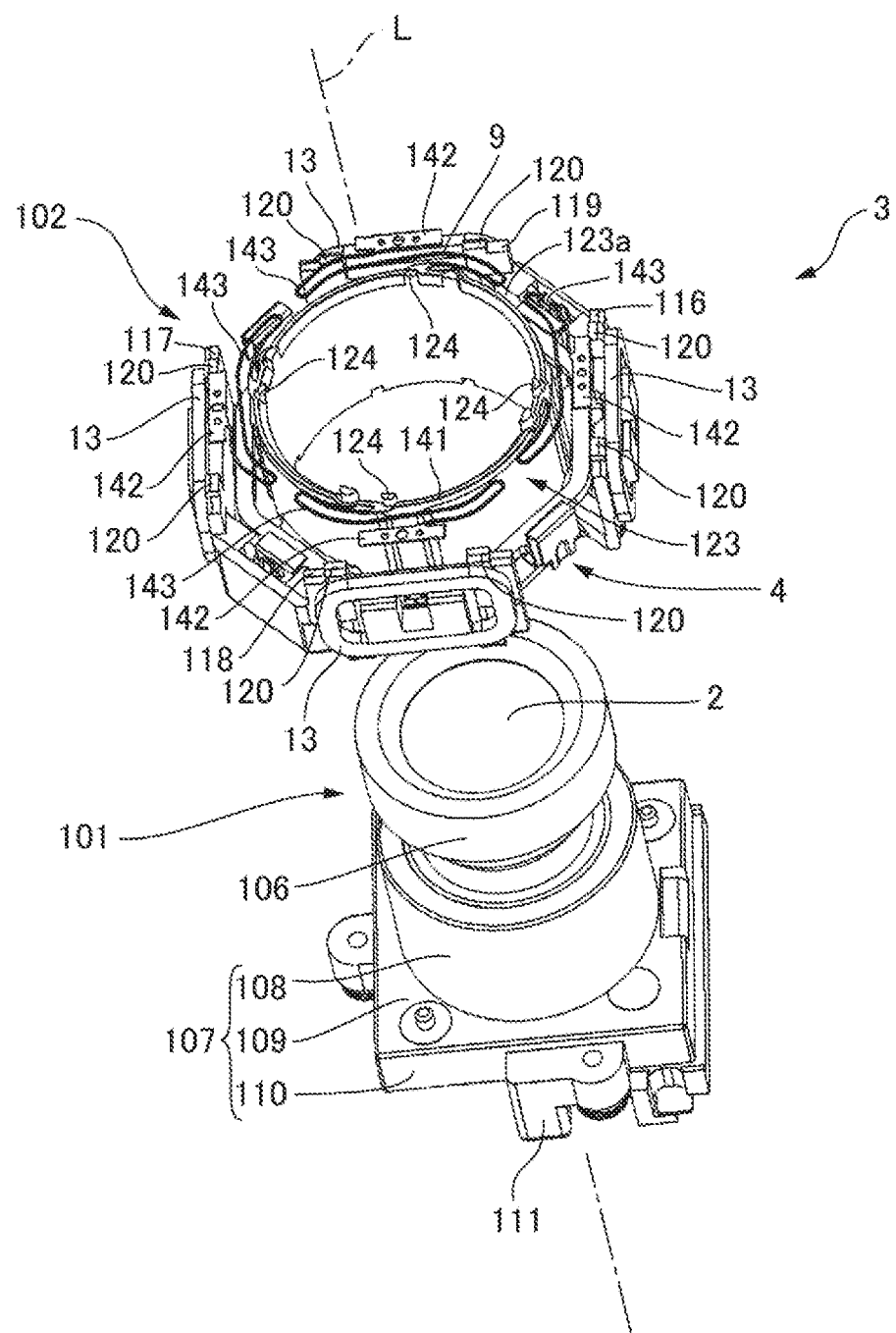
FIG. 8 is an exploded perspective view of the movable member when seen from the object side.
Figure 9:
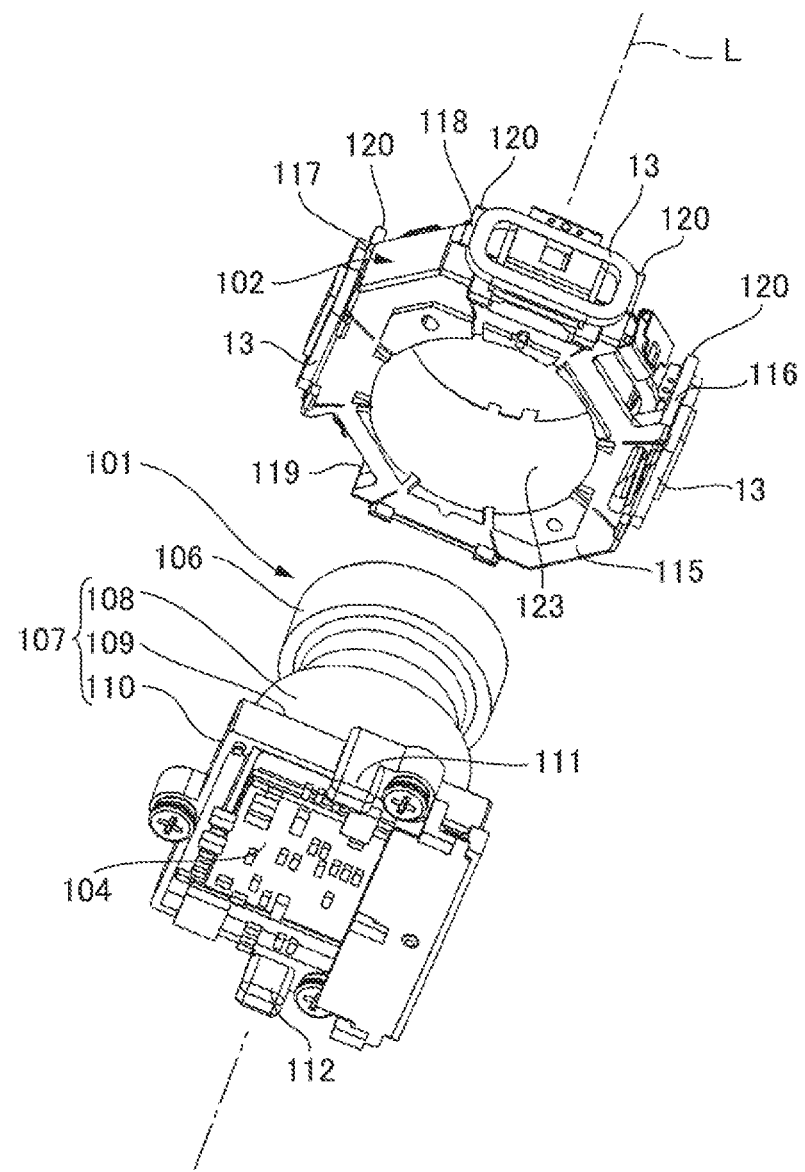
FIG. 9 is an exploded perspective view of the movable member when seen from the counter-object side.

FIG. 8 is an exploded perspective view of the movable member 3, the swingable supporting mechanism 4, and the plate spring 9 when seen from the side in the +Z direction (object side). FIG. 9 is an exploded perspective view of the movable member 3, the swingable supporting mechanism 4, and the plate spring 9 when seen from the side in the −Z direction (counter-object side). As shown in FIG. 8 and FIG. 9, the movable member 3 is provided with: a camera module 101; and a camera module holder 102 configured to hold the camera module 101 from the outer circumferential side. The camera module 101, as shown in FIG. 2, has an optical element 2 and an image pickup element 103 that is positioned on the optical axis of the optical element 2. The image pickup element 103 is implemented on a board 104 on which an electronic device such as a gyroscope or a signal processing circuit has been mounted.

In addition, the camera module 101 has: a mirror cylinder member 106 configured to hold the optical element 2; and a frame 107 configured to hold the mirror cylinder member 106 and the board 104. As shown in FIG. 8, the frame 107 is provided with: a cylinder part 108 configured to hold, on the inner circumferential side, an end portion in the −Z direction of the mirror cylinder member 106; a rectangular plate part 109 spreading to the outer circumferential side from an end edge in the −Z direction of the cylinder part 108; and a rectangular tube part 110 (board holder) extending in the −Z direction from an outer circumferential edge of the plate part 109. As shown in FIG. 9, the board 104 is adhered to a face on the counter-object side of the rectangular plate part 109 so as to be held on the inner circumferential side of the rectangular tube part 110. A dimensional outer diameter of the largest diameter portion of the mirror cylinder member 106 (tip end portion on the object side) and a dimensional outer diameter of the cylinder part 108 of the frame 107 are the same as each other, or alternatively, the dimensional outer diameter of the largest diameter portion of the mirror cylinder member 106 (tip end portion on the object side) is smaller than the dimensional outer diameter of the cylinder part 108 of the frame 107.

In the rectangular tube part 110, in the Y axis direction, an optical axis (axis L), an image pickup element 103, and a first projection part 111 for stopper and a second projection part 112 for stopper that project in the −Z direction on both side on which the board 104 is sandwiched therebetween are provided.

As shown in FIG. 9, the camera module holder 102 is provided with: a bottom plate part 115 formed in a substantially octagonal shape when seen from the side in the Z axis direction; a pair of wall parts 116, 117 rising in the +Z direction and extending in the Y axis direction on both ends in the X axis direction of the bottom plate part 115; and a pair of wall parts 118, 119 rising in the +Z direction and extending in the X axis direction on both sides in the Y axis direction of the bottom plate part 115. On end faces in the +Z direction in the respective wall parts 116, 117, 118, 119, two second projection parts 120 for stopper that project in the +Z direction are provided. The two second projection parts 120 for stopper respectively project from both end portions in the circumferential directions in each of the wall parts 116, 117, 118, 119. To each of the wall parts 116, 117, 118, 119, the swing driving coil 13 is fixed.

In addition, the camera module holder 102 is provided with a cylindrical holding part 123 rising in the +Z direction from an edge of a circular through hole that is formed in a center of the bottom plate part 115. In the camera module 101, the cylinder part 108 of the frame 107 is held on the inner circumferential side of the holding part 123. On an annular end face 123*a* in the +Z direction of the holding part 123, plate spring bonding projection parts 124 for fixing the plate spring 9 are provided in four locations at equal angular intervals. As shown in FIG. 6, in the annular end face 123*a*, the outer circumferential side of the plate spring bonding projection part 124 is a movable side plate spring fixing part 123*a* that fixes the plate spring 9 thereto. The plate spring 9 is fixed to the movable side plate spring fixing part 123*b* via an adhesive layer.

(Swingable Supporting Mechanism)

Figure 10:
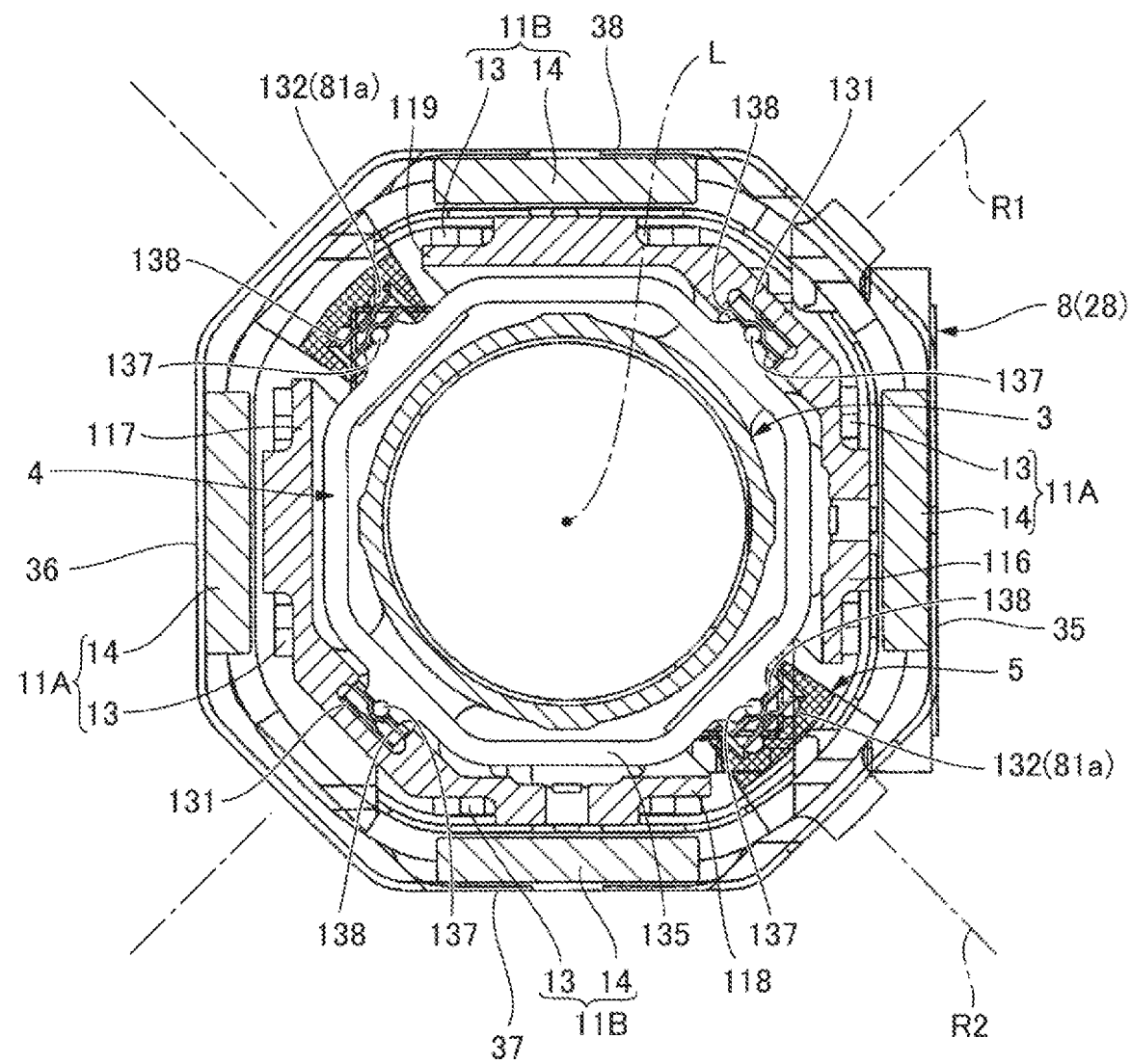
FIG. 10 is a sectional view of the optical unit when taken along a plane orthogonal to an axis.
Figure 10:
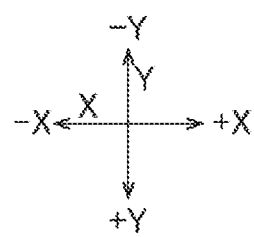

FIG. 10 is a sectional view of the optical unit 1 when taken along a plane that is orthogonal to the axis L, the plane passing through the swingable supporting mechanism 4. The swingable supporting mechanism 4 is arranged between the camera module holder 102 and the holder main body member 81. As shown in FIG. 6 and FIG. 7, the swingable supporting mechanism 4 is provided with: two first swingable supporting parts 131 that are provided in diagonal locations on a first axis R1 of the camera module holder 102; two second swingable supporting parts 132 that are provided in diagonal locations on a second axis R2 of the holder main body member 81; and a movable frame 135 that is supported by the first swingable supporting part 131 and the second swingable supporting part 132. Here, the first axis R1 and the second axis R2 each correspond to a direction tilting at an angle of 45 degrees relative to the X axis direction and the Y axis direction. Therefore, the first swingable supporting part 131 and the second swingable supporting part 132 each are disposed in an angular location between the X axis direction and the Y axis direction. As shown in FIG. 6 and FIG. 7, the second swingable supporting part 132 corresponds to a depression part 81*a* that is formed in an inside face of the holder main body member 81.

As shown in FIG. 10, the movable frame 135 corresponds to a plate-shaped spring formed in a substantially octagonal shape in planar view as seen from the side in the Z axis direction. On an outside face of the movable frame 135, metallic balls 137 are fixed by way of any means such as welding in four locations at the periphery of the axis L. These balls 137 respectively come into point contact with contact springs 138 held by the first swingable supporting part 131 that is provided in the camera module holder 102 and the second swingable supporting part 132 that is provided in the holder main body part 81. The contact spring 138 is a plate-shaped spring, the contact spring 138 held by the first swingable supporting part 131 is elastically deformable in the direction of the first axis R1, and the contact spring 138 held by the second swingable supporting part 132 is elastically deformable in the direction of the second axis R2. Therefore, the movable frame 135 is supported in a rotatable manner at the periphery of each of the two directions (the direction of the first axis R1 and the direction of the second axis R2) that are orthogonal to the Z axis direction.

(Plate Spring)

FIG. 11A is a plan view of the plate spring 9 when seen from the side in the Z axis direction, and FIG. 11B is a plan view of the movable member 3 and the holder 5 in a state in which the plate spring 9 is overhung when seen from the side in the +Z direction. As shown in FIG. 2, the plate spring 9 is overhung between the annular end face 123*a* of the holding part 123 of the camera module holder 102 (end face in the +Z direction) and the annular end face 84*a* oriented in the −Z direction in the holder side opposing part 84 of the holder main body member 81. The plate spring 9 defined a reference position of the movable member 3. That is, the position (reference position) of the movable member 3 (camera module 101) in a still state in which the magnetic driving mechanism 11 for swing is not driven is determined by the plate spring 9. As shown in FIG. 6, FIG. 7, and FIG. 11A, the plate spring 9 is a plate spring formed in the shape of a rectangular frame in which a metal plate has been machined.

As shown in FIG. 11A, the plate spring 9 is provided with: an annular movable side linking part 141 that is fixed to the movable side plate spring fixing part 123*b* of the holding part 123; four side linking parts 142 that are fixed to an end face of the holder main body member 81; and a meandering part 143 that is positioned between the movable member side linking part 141 and each of the holder side linking parts 142. The holder side linking parts 142 are disposed in two locations in which the optical axis L is sandwiched between both sides in the X axis direction and in two locations in which the optical axis L is sandwiched between both sides in the Y axis direction.

The movable member side linking part 141 is provided with: four link portions 141*a* having cutouts that are positioned on the outer circumferential sides of the four plate spring bonding projection parts 124 that are provided in the annular end faces 123*a* of the holding part 123; and connecting portions 141*b* formed in the shape of an arc and connecting the link portions 141*a* that are respectively adjacent to each other in the circumferential direction. Here, the movable member side linking part 141 is fixed to the annular end face 123*a* via an adhesive layer. Therefore, in the state in which the movable member side linking part 141 has been fixed to the annular end face 123*a*, the plate spring 9 is unstable in the +Z direction from the annular end face 123*a*. The four link portions 141*a* are respectively fixed to the spring bonding projection parts 124 via the adhesive layer. Therefore, in the state in which the link portions 141*a* have been fixed to the plate spring bonding projection parts 124, respectively, a gap is provided in a radial direction between the link portion 141a and the plate spring bonding projection part 124.

The meandering part 143, as shown in FIG. 11B, is provided with: a first extension portion 143a extending to one side (clockwise direction) in the circumferential direction on the outer circumferential side of the holding part 123 from the link portion 143a that is positioned on the outer circumferential side of the spring bonding projection part 124 in the state in which the movable side linking part 141 has been fixed to the holding part 123; a first return portion 143b curving to the other side in the circumferential direction from a tip end of the first extension portion 143a to the outer circumferential side; a second extension portion 143c extending from a tip end of the first return portion 143b to the other side (counterclockwise direction) in the circumferential direction on the outer circumferential side of the first extension portion 143a from a tip end of the first return portion 143b; a second return portion 143d curving to one side in the circumferential direction from a tip end of the second extension portion 143c to the outer circumferential side; and a third extension portion 143e extending to one side (clockwise direction) on the outer circumferential side of the second extension portion 143c from a tip end of the second return portion 143d. The tip end of the third extension portion 143e is positioned at the other side more significantly than the plate spring bonding projection part 124, and is connected to the holder side linking part 142.

(First Stopper Mechanism and Second Stopper Mechanism)

Here, as shown in FIG. 2, a first projection part 111 for stopper and a second projection part 112 for stopper projecting in the −Z direction from the movable member 3 (camera module 101) when the movable member 3 has been swingably held by the holder 5; and a rectangular projection portion 82b that is provided on the opposing face 82a of the holder bottom plate member 82 respectively oppose to each other in the Z axis direction and configure the first stopper mechanism 17 configured to define the swinging range of the movable member 3. That is, the movable member 3 is set in a tilt position exceeding the swinging range and the first projection part 111 for stopper or the second projection part 112 for stopper abut against a tip end face (tip end part, that is, an abutment target) of the projection portion 82b and then restricts any more tilting of the movable member 3. Further, in the first stopper mechanism 17, in a case where the movable member 3 has been moved in the −Z direction by way of an external force, the first projection part 111 for stopper and the second projection part 112 for stopper abut against the projection portion 82b and then restricts any more movement of the movable member 3 in the −Z direction.

In addition, when the movable member 3 has been swingably held by the holder 5, the second projection part 120 for stopper, that is provided in the movable member 3 (camera module holder 102), and the annular end face 84a (second abutment target) in the −Z direction of the holder side opposing part 84 (second supporting member opposing part) of the holder main body member 81 respectively oppose to each other in the Z axis direction, and configure the second stopper mechanism 18 configured to define a second swing range of the movable member 3. That is, if the movable member 3 is set in the tilt position exceeding the second swinging range, the second projection part 120 for stopper abuts against the annular end face 84a and then restricts any more tilting of the movable member 3. Further, in the second stopper mechanism 18, in a case where the movable member 3 has been moved in the +Z direction by way of an external force, the projection part 120 for stopper abuts against the annular end face 84a and then restricts any more movement of the movable member 3 in the +Z direction. Incidentally, it is to be noted that the second swinging range that the second stopper mechanism 18 defines is the same as the swinging range that the first stopper mechanism 17 defines.

(First Rotation Supporting Mechanism and Second Rotation Supporting Mechanism)

Next, a description will be given with respect to the first rotation supporting mechanism 6 and the second rotation supporting mechanism 7 configured to rotatably support the holder 5 at the periphery of the axis L. As shown in FIG. 2, FIG. 3, and FIG. 4, the first rotation supporting mechanism 6 is provided with: a plurality of balls 151 (rollers) and a retainer 152 configured to retain the ball 151 between the fixing member side opposing part 55 and the holder side opposing part 84. As shown in FIG. 3 and FIG. 4, the retainer 152 has a plurality of through holes 153 that are arranged at equal intervals in the circumferential direction. A respective one of the plurality of balls 151 is inserted into the fixing member side annular groove 156 and the holder side annular groove 90, in a state in which each ball is disposed inside of the respective one of the plurality of through holes 153. Lubricating oil is applied to the inner circumferential face of each of the fixing member side annular groove 56 and the holder side annular groove 90. In the present embodiment, the number of balls 151 and the number of through holes 153 each are six. The through holes 153 are provided at equal angular intervals at the periphery of the axis L. The balls 151 roll on the fixing member side annular groove 56 and the holder side annular groove 90 in a state in which these balls are respectively inserted into the through holes 153.

In addition, the retainer 152 is provided with: a first projection part 154 that projects toward the fixing member side opposing part 55; and a second projection part 155 that projects toward the holder side opposing part 84 between the two through holes 153 that are adjacent to each other in the circumferential direction. As shown in FIG. 3, the first projection part 154 extends in the radial direction, and is provided with an arc face that projects in the +Z direction from each end in the circumferential direction to a center. As shown in FIG. 4, the second projection part 155 extends in the radial direction, and is provided with an arc face that projects in the −Z direction from each end in the circumferential direction to the center. A center portion in the circumferential direction of the first projection part 154 is capable of coming into slide contact with an edge portion on the inner circumferential side and an edge portion on the outer circumferential side of the fixing member side annular groove 56 in the fixing member side opposing part 55. A center portion in the circumferential direction of the second projection part 155 is capable of coming into slide contact with an edge portion on the inner circumferential side and an edge portion on the outer circumferential side of the holder side annular groove 90 in the holder side opposing part 84. Further, the retainer 152 has cutout parts 152a in two spaced locations of an outer circumferential edge. In the present embodiment, the cutout parts 152a are provided at angular intervals of 180 degrees.

Here, as shown in FIG. 2, at an end portion of the inner circumferential side more significantly than the fixing member side annular groove 56 in the fixing member side opposing part 55, an annular projection part 157 that projects in the −Z direction is provided. On the other hand, at an end portion of the inner circumferential side more significantly than the holder side annular groove 90 in the holder side opposing part 84, an annular stepped part 158 depressed in the −Z direction and configured to receive a tip end portion of the annular projection part 157 is provided. The annular stepped part 158 is provided with: an annular radial opposing face 158*a* that opposes at small intervals from the outer circumferential side at the tip end portion of the annular projection part 157; and an annular axial opposing face 158*b* that opposes at small intervals from the side in the Z axis direction at the tip end portion of the annular projection part 157. A space between the annular projection part 157 and the radial opposing face 158*a* and a space between the annular projection part 157 and the axial opposing face 158*b* communicate with each other, and these spaces configure a Labyrinth seal. This Labyrinth seal prevents or restricts entry of dust between the fixing member side opposing part 55 on which the ball 151 rolls and the holder side opposing part 84.

Next, the ball bearing 68 of the second rotation supporting mechanism 7, as shown in FIG. 2, is provided with: an inner ring 68*b* that is held on the outer circumferential side of the shaft part 96 of the holder 5 (holder bottom plate member 82); an outer ring 68*a* that is positioned on the outer circumferential side of the inner ring 68*b*; and a plurality of balls 68*c* that roll between the inner ring 68*b* and the outer ring 68*a* in the radial direction. The outer ring 68*a* is held by the movable holder 26.

Here, the plate spring 25 is configured to impart, to the ball bearing 68, a given pressure (biasing force F) that is applied in the +Z direction. That is, the plate spring 25 is configured to bias the movable holder 26 toward the holder bottom plate member 82 to thereby bias the outer ring 68*a* that is held by the holder 5 to the holder bottom plate member 82. In this manner, the inner ring 68*b* and the outer ring 68*a* are positioned with respect to a relative location in the Z axis direction with reference to the holder bottom plate member 82. In addition, by the given pressure (biasing force F of the plate spring 25), a state in which the outer ring 68*a* has abutted against the holder bottom plate member 82 is maintained. In this manner, rotation of the holder 5 that is supported by the second rotation supporting mechanism 7 is stabilized.

Further, the plate spring 25 is configured to bias the holder 5 toward the fixing member side opposing part 55 of the fixing member 8 (object side casing 29) via the movable holder 26 and the outer ring 68*a*. In this manner, the plate spring 25 imparts, to the first rotation supporting mechanism 6, a given pressure (biasing force F of FIG. 2) that is applied in the +Z direction. That is, the plate spring 25 is configured to bias the holder side opposing part 84 toward the fixing member side opposing part 55 in the Z axis direction. In this manner, the holder side opposing part 84 and the fixing member side opposing part 55 are not spaced from each other in the Z axis direction and thus the ball 151 that is held by the retainer 152 does not slip off from a gap between the holder side annular groove 90 of the holder side opposing part 84 and the fixing member side annular groove 56 of the fixing body side opposing part 55, and the holder 5 smoothly rotates relative to the fixing member 8.

(Third Stopper Mechanism)

Here, as shown in FIG. 1, when the holder 5 has been rotatably supported by the fixing member 8, a projection 91 that is provided in the holder 5 (holder body part) is inserted into the cutout part 40 of the fixing member 8 (cylindrical casing 28) from the inner circumferential side. In this manner, the cutout part 40 of the fixing member 8 and the projection 91 of the holder 5 configure the third stopper mechanism 19 configured to restrict a rotation range at the periphery of the axis L of the holder 5 (second movable member 10). That is, in the holder 5, the projection 91 rotates in the cutout part 40 at the periphery of the axis L in a movable range in the circumferential direction.

(Magnetic Driving Mechanism for Swing)

Next, the magnetic driving mechanism 11 for swing, as shown in FIG. 10, is provided with a first magnetic driving mechanism 11A for swing and a second magnetic driving mechanism 11B for swing, both of which are provided between the movable member 3 and the fixing member 8. The first magnetic driving mechanism 11A for drive is provided in two sets, each of which consists of a swing driving magnet 14 and a swing driving coil 13 respectively opposing to each other in the X axis direction. The second magnetic driving mechanism 11B for swing is provided in two sets, each of which consists of the swing driving magnet 14 and the swing driving coil 13 respectively opposing to each other in the Y axis direction. The swing driving coil 13 is held on the outside faces of the wall parts 116, 117 on both sides in the X axis direction and the wall parts 118, 119 on both sides in the Y axis direction of the camera module holder 102. The swing driving magnet 14 is held on the inside face of each of the side plates 35, 36, 37, 38 that are provided in the cylindrical casing 28 of the fixing member 8. Each swing driving magnet 14, as shown in FIG. 3 and FIG. 4, is divided into two sections in the X axis direction, and the magnetic poles on the interior face side are magnetized so as to be different from each other with reference to a divisional location (magnetized polarized line). The swing driving coil 13 is a coreless coil, and the long edge portions in the +Z direction and −Z direction each are utilized as an effective edge. Here, the cylindrical casing 28 is made of a magnetic material and thus function as a yoke relative to the swing driving magnet 14.

Two sets of the second magnetic driving mechanism 11B for swing, both of which are positioned in the +Y direction and the −Y direction of the movable member 3, are connected by way of wiring so that a magnetic driving force in the same direction at the periphery of the X axis is generated when power is supplied to the swing driving coil 13. In addition, two sets of the first magnetic driving mechanism 11A for swing, both of which are positioned in the +X direction and the −X direction of the movable member 3 are connected by way of wiring so that a magnetic driving force in the same direction at the periphery of the Y axis is generated when power is supplied to the swing driving coil 13. The magnetic driving mechanisms 11 for swing is configured to combine rotation at the periphery of the X axis by the second magnetic driving mechanism 11B for swing and rotation of the Y axis by the first magnetic driving mechanism 11A for swing with each other to thereby rotate the movable member 3 at the periphery of the first axis R1 and the second axis R2. In a case where image stabilization at the periphery of the X axis and image stabilization at the periphery of the Y axis are carried out, this driving mechanism is configured to combine the rotation at the periphery of the first axis R1 and the rotation at the periphery of the second axis R2 with each other.

(Magnetic Driving Mechanism for Rolling)

The magnetic driving mechanism 12 for rolling, as shown in FIG. 2 and FIG. 7, in the holder bottom plate 82, is provided with: two rolling driving coils 15 held by the rolling driving coil holding parts 97 that are provided on both sides on which the shaft part 96 is sandwiched therebetween in the Y axis direction; and two rolling driving magnets 16 held by the movable holder of the fixing member 8 and opposing to the respective rolling driving coils 5 in the Z axis direction. Each rolling driving magnet 16 is divided into two sections in the circumferential direction as shown in FIG. 3 and FIG. 5, and the magnetic poles on a face opposing to the rolling driving coil 15 are magnetized so as to be different from each other with reference to a divisional location (magnetized polarized line). Each rolling driving coil 15 is a coreless coil, and a long edge portion extending in the radial direction is utilized as an effective edge.

(Image Stabilization of Optical Unit)

The optical unit 1, as described above, is provided with the magnetic driving mechanism 11 for rolling, configured to carry out image stabilization at the periphery of the X axis and image stabilization at the periphery of the Y axis. Therefore, this optical unit is capable of carrying out image stabilization in the pitching (vertical swing) direction and the yawing (transverse swing) direction. In addition, the optical unit 1 is provided with the magnetic driving mechanism 12 for rolling and thus this optical unit is capable of carrying out image stabilization in the rolling direction. Here, in the optical unit 1, the movable member 3 is provided with a gyroscope, and by way of the gyroscope, the vibration at the periphery of the three axes orthogonal to each other is detected and the magnetic driving mechanism 11 for swing and the magnetic driving mechanism 12 for rolling are driven so as to eliminate the detected vibration.

(Drawing Flexible Printed Circuit Board)

Figure 12:
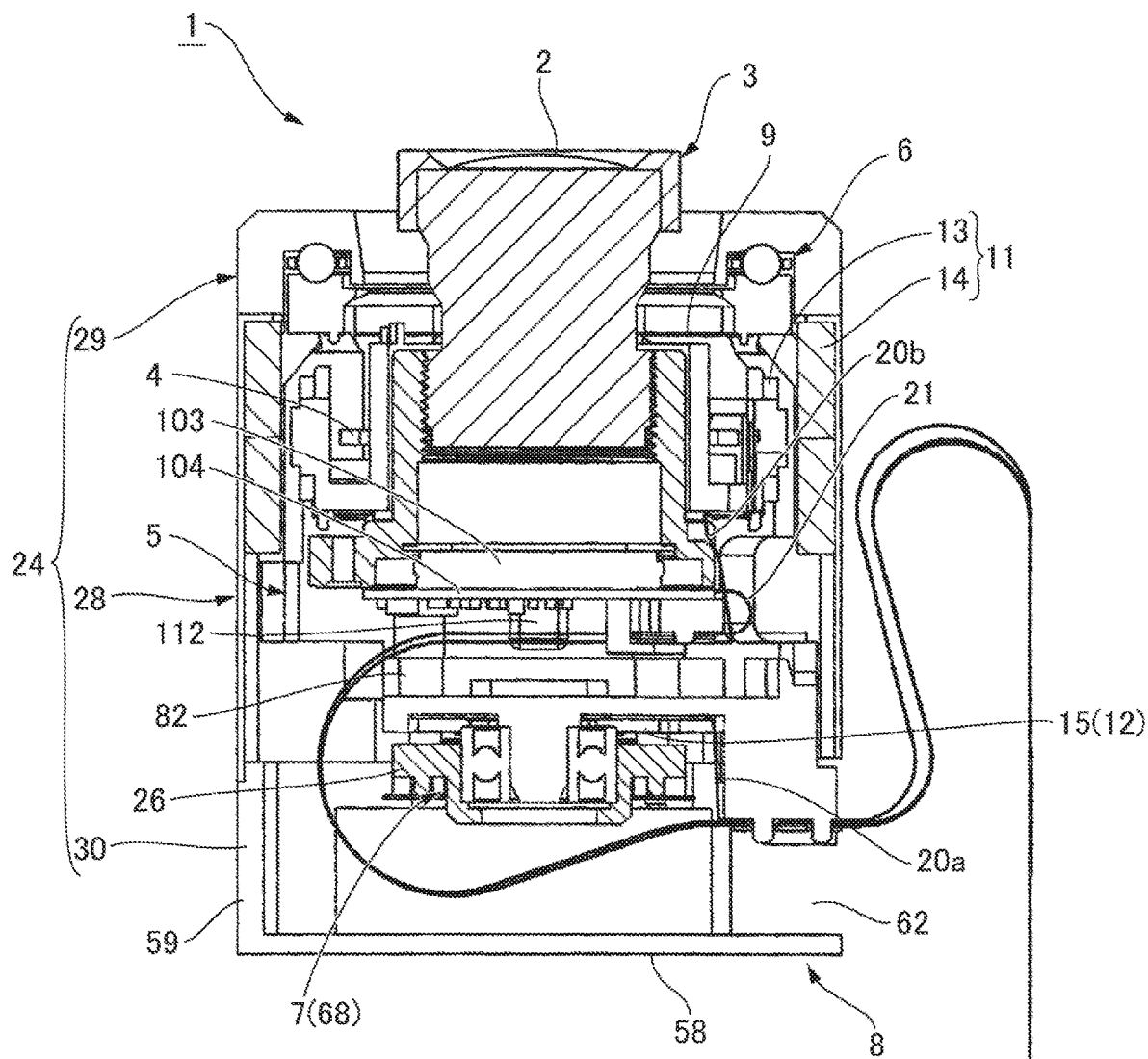
FIG. 12 is a sectional view of the optical unit when taken along the axis and a plane that passes through a flexible printed circuit board.

FIG. 12 is a sectional view of the optical unit 1 when taken along a plane passing through the axis L and the flexible printed circuit boards 20a, 20b. As shown in FIG. 12, the flexible printed circuit board 20a is electrically connected to the rolling driving coil 15 that is held by the holder bottom plate member 82. The flexible printed circuit board 20b is electrically connected to the swing driving coil 13 that is fixed to the camera module 101, the swing driving coil being fixed to the respective wall parts 116, 117, 118, 119 of the camera module holder 102. The flexible printed circuit board 21 is electrically connected to the board 104 that is fixed to the camera module 101, the board being held by the rectangular tube part 110 of the camera module 101.

The flexible printed circuit board 20b and the flexible printed circuit board 21 are drawn between the movable member 3 and the holder 5 (holder bottom plate member 82) and then are drawn between the holder 5 (holder bottom plate member 82) and the fixing member 8 (counter-object side casing 30), and are drawn to the outside from the aperture part 62 of the counter-object side casing 30. Here, the flexible printed circuit board 20b and the flexible printed circuit board 21, in a location between the movable member 3 and the holder 5, are drawn in the X axis direction between the first projection part 11 for stopper and the second projection part 112 for stopper, of the first stopper mechanism 17.

Functions and Advantageous Effects

According to the optical unit 1 with shake correction function of the present embodiment, the first stopper mechanism 17 configured to define the swinging range of the movable member 3 is composed of: the first projection part 111 for stopper and the second projection part 112 for stopper, that is provided in the camera module 101; and the projection portion 82b (abutment target) of the holder bottom plate member 82. Therefore, when the first projection part 111 for stopper and the second projection part 112 for stopper; and the projection portion 82b of the holder bottom plate member 82 abut against each other and then movement in the Z axis direction of the movable member 3 is restricted, the camera module 101 does not move in the Z axis direction any more. Accordingly, slippage of the camera module 101 from the camera module holder 102 of the movable member 3 can be prevented or restricted.

In addition, the camera module 101 is provided with the rectangular tube part 110 (board holder) configured to hold the board 104 on which the image pickup element 103 has been implemented, and the first projection part 111 for stopper and the second projection part 112 for stopper projects from the rectangular tube part 110. Therefore, when the first projection part 111 for stopper and the second projection part 112 for stopper; and the projection portion 82b of the holder bottom plate member 82 abut against each other, the related impact is not directly transmitted to the image pickup element 103. Accordingly, damage to the image pickup element 103 cannot be prevented or restricted.

Further, the first projection part 111 for stopper and the second projection part 112 for stopper are provided while the image pickup element 103 is sandwiched therebetween. In this manner, a gap can be allocated between the first projection part 111 for stopper and the second projection part 112 for stopper and thus when the first projection part 111 for stopper and the second projection part 112 for stopper; and the projection portion 82b of the holder bottom plate member 82 abut against each other, the movable member 3 does not tilt, and the related impact at the time of abutment can be uniformly received by the first projection part 111 for stopper and the second projection part 112 for stopper.

Furthermore, in the present embodiment, the second projection part 120 for stopper, that projects in the +Z direction from the camera module holder 102, and the annular end face 84a in the −Z direction of the holder side opposing part 84 configure the second stopper mechanism 18 configured to define the second swinging range of the movable member 3. In this manner, when the movable member 3 has been moved in the +Z direction of the Z axis direction by way of an internal force, the second projection part 120 for stopper and the holder side opposing part 84 abut against each other in the optical axis direction, and can restrict movement of the movable member 3. In addition, in the present embodiment, the first stopper mechanism 17 and the second stopper mechanism 18 are provided, so that the swinging range of the movable member 3 can be reliably defined, Further, the first projection part 111 for stopper and the second projection part 112 for stopper abut against the projection portion 82b of the holder bottom plate member 82. In this manner, any portion other than the projection portion 82 in the holder bottom plate member 82 can be reduced in thickness in the Z axis direction, so that the holder 5 can be reduced in weight.

In addition, in the present embodiment, the flexible printed circuit board 20b and the flexible printed circuit board 21, in a location between the movable member 3 and the holder 5, are drawn in the X axis direction between the first projection part 111 for stopper and the second projection part 112 for stopper, of the first stopper mechanism 17. Therefore, the first projection part 111 for stopper and the second projection part 112 for stopper do not interfere with the flexible printed circuit board 20b and the flexible printed circuit board 21. In addition, even in a case where the movable member 3 has been moved in the −Z by way of an external force, the flexible printed circuit board 20b and the flexible printed circuit board 21 are not collapsed while being sandwiched between the movable member 3 and the holder 5.

Further, in the present embodiment, the holder bottom plate member 82 provided with the projection portion 82b which the first projection part 111 for stopper and the second projection part 112 for stopper abut against is provided with the rolling driving coil 15 of the magnetic driving mechanism 12 for rolling. Therefore, a member that configures the first stopper mechanism 17 and a member configured to hold the rolling driving coil 15 are made compatible with each other.

Modification Examples

Incidentally, a projection part for stopper, that projects in the +Z direction from the holder bottom plate member 82, is provided and then an abutment target which the projection part for stopper can abut against is provided on the side of the camera module 101, and the first stopper mechanism 17 may be thereby configured. In this manner, when the projection part for stopper, of the holder bottom plate member 82, and the abutment target of the camera module 101 abut against each other and then movement in the Z axis direction of the movable member 3 is restricted, the camera module 101 does not move in the Z axis direction any more. Accordingly, slippage of the camera module 101 from the camera module holder 102 can be prevented or restricted.

In addition, the second projection part for stopper, that projects in the −Z direction of the holder side opposing part 84 from the annular end face 84a in the −Z direction, is provided and then the abutment target (second abutment target) which the second projection part for stopper can abut against is provided in the camera module holder 102, and the second stopper mechanism 18 may be thereby configured.

Incidentally, the layouts of the swing driving coil 13 and the swing driving magnet 14 can be exchanged from each other. That is, it may be that the swing driving coil 13 is held by the fixing member 8 and the swing driving magnet 14 is held by the movable member 3. In addition, the layouts of the rolling driving coil 15 and the rolling driving magnet 16 can be exchanged from each other. That is, it may be that the rolling driving coil 15 is held by the fixing member 8 (movable holder 26), and the rolling driving magnet 16 is held by the holder 5 (holder bottom plate member 82).

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with shake correction function, the optical unit comprising:
    a movable member comprising:
        a camera module comprising an optical element and an image pickup element that is positioned on an optical axis of the optical element; and
        a camera module holder comprising a cylindrical holding part configured to hold the camera module from an outside in a radial direction that is orthogonal to the optical axis;
    a swingable supporting mechanism configured to swingably support the movable member;
    a supporting member configured to support the movable member via the swingable supporting mechanism;
    a swing magnetic driving mechanism configured to swing the movable member;
    a stopper mechanism configured to restrict a swinging range of the movable member;
    a flexible printed circuit board electrically connected to the image pickup element;
    a fixing member configured to rotatably support the supporting member around a predetermined axis; and
    a rolling magnetic driving mechanism configured to rotate the supporting member around the predetermined axis,
    wherein the swingable supporting mechanism is configured to swingably support the movable member between a reference position in which the optical axis and the predetermined axis are coincident with each other and a tilt position in which the optical axis tilts relative to the predetermined axis,
    when a side on which the optical element is positioned in the optical axis direction is defined as an object side and a side on which the image pickup element is positioned is defined as a counter-object side, the supporting member comprises a holder bottom plate member having an opposing face that faces the counter-object side of the camera module,
    the camera module comprises a board holder configured to hold a board in which the image pickup element has been implemented, and the board holder comprises a first projection part and a second projection part, which are stopper projection parts and are projected from the board holder so as to be disposed while the optical axis and the image pickup element are sandwiched therebetween,
    the opposing face of the holder bottom plate member comprises abutment targets which are capable of abutting against the first projection part and the second projection part,
    a counter-object side face of the holder bottom plate member comprises a fixing part configured to hold one of a coil and a magnet structuring the rolling magnetic driving mechanism,
    the fixing member comprises an other of the coil and the magnet structuring the rolling magnetic driving mechanism which is provided on the counter-object side with respect to the one of the coil and the magnet provided on the holder bottom plate member in a direction of the predetermined axis, and
    the flexible printed circuit board is connected to the board after drawn between the first projection part and the second projection part.

2. The optical unit with shake correction function according to claim 1, comprising a second stopper mechanism configured to define the swinging range, wherein
    the supporting member comprises a holder main body member that is positioned on an outer circumferential side of the movable member,
    the holder main body member comprises a second supporting member opposing part that opposes to a face on the object side of the camera module holder, and
    the second stopper mechanism comprises:
        a second projection part that projects from either one of the camera module holder and the second supporting member side opposing part to an other of the camera module holder and the second supporting member side opposing part; and a second abutment target that is capable of abutting the second projection part in the other of the camera module holder and the second supporting member side opposing part.

3. The optical unit with shake correction function according to claim 1, wherein the holder bottom plate member comprises a projection portion that projects from the opposing face to the first projection part and the second projection part of camera module, and the abutment target is a tip end part of the projection portion.

* * * * *